United States Patent
Alpi et al.

(10) Patent No.: US 8,985,586 B1
(45) Date of Patent: *Mar. 24, 2015

(54) METHOD AND APPARATUS FOR SEALING CONNECTIONS BETWEEN ELECTRICAL EXTENSION CORDS

(71) Applicants: Dan Alpi, Dove Canyon, CA (US); Scott Alpi, San Diego, CA (US)

(72) Inventors: Dan Alpi, Dove Canyon, CA (US); Scott Alpi, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/292,660

(22) Filed: May 30, 2014

Related U.S. Application Data

(63) Continuation-in-part of application No. 12/775,364, filed on May 6, 2010, now Pat. No. 8,740,223.

(60) Provisional application No. 61/176,410, filed on May 7, 2009.

(51) Int. Cl.
  *H02G 15/04* (2006.01)
  *H02G 15/18* (2006.01)
  *H01R 43/26* (2006.01)

(52) U.S. Cl.
  CPC .............. *H02G 15/18* (2013.01); *H02G 15/04* (2013.01); *H01R 43/26* (2013.01)
  USPC ......................................... 277/314; 277/312

(58) Field of Classification Search
  USPC .................. 277/312, 314, 316, 922
  See application file for complete search history.

(56) References Cited

U.S. PATENT DOCUMENTS

| | | | |
|---|---|---|---|
| 3,879,575 A | 4/1975 | Dobbin et al. | |
| 4,718,678 A | 1/1988 | Vansant | |
| 4,849,580 A | 7/1989 | Reuter | |
| 4,863,535 A * | 9/1989 | More | 156/49 |
| D372,074 S | 7/1996 | Wallace et al. | |
| 6,145,280 A * | 11/2000 | Daroux et al. | 53/433 |
| 7,572,979 B2 * | 8/2009 | Otsuki et al. | 174/84 R |
| 7,769,261 B2 * | 8/2010 | Lu | 385/100 |
| 8,210,862 B1 * | 7/2012 | Cargo | 439/278 |
| 2005/0121380 A1 * | 6/2005 | De La Cruz | 210/321.83 |
| 2007/0209821 A1 * | 9/2007 | Otsuki et al. | 174/88 R |

* cited by examiner

*Primary Examiner* — Gilbert Lee
(74) *Attorney, Agent, or Firm* — Knobbe Martens Olson & Bear LLP

(57) ABSTRACT

An apparatus and method for sealing an electrical connection, such as a connection between two electrical extension cords, thereby protecting the electrical connection from moisture or water intrusion. The electrical connection is surrounded by a flexible, substantially water-impermeable material, such as a plastic sheet. The sheet has strips of adhesive around its perimeter. The sheet is wrapped around the electrical connection such that adhesive on one portion of the sheet is joined to adhesive on another portion of the sheet to form a sealed volume that surrounds the electrical connection. The electrical connection also may be sealed within a plastic sleeve having adhesive strips along the inside edge of the opening at each end of the sleeve. The sealing apparatus is a temporary, disposable, one-time use item that quickly and easily seals connections between extension cords, such as three-prong plug-in type extension cords used outdoors at concert venues, sporting events, construction sites and the like.

28 Claims, 2 Drawing Sheets

METHOD AND APPARATUS FOR SEALING CONNECTIONS BETWEEN ELECTRICAL EXTENSION CORDS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

The present invention relates to a method and apparatus for sealing connections between electrical extension cords and, more particularly, to a method and apparatus for protecting electrical extension cord connections from moisture by sealing a water-impermeable material around them.

Electrical extension cords are commonly used in outdoor or exposed environments, such as concert venues, sports venues, construction sites, and the like. Often connections between electrical extension cords must be placed in areas where they are exposed to moisture or weather, including rain, snow, and ice. Electrical connections that are exposed to water create an increased risk of electric shock. Also, the equipment that is connected to the electrical cords, such as cameras, microphones, monitors, lights, etc., may be damaged if the electrical connections become wet and cause a short in the electrical circuit.

Prior methods of sealing or protecting connections between electrical extension cords are inefficient and not entirely effective. In some situations it might be possible to simply place the connection in an area where it will not get wet such as under a roof or overhang. However, this is often not an option in outdoor settings because there is no such protected area available. One common method involves wrapping the connection with pieces of plastic or other waterproof material and then taping down the material at both ends with duct tape or electrical tape. This method is inconvenient and inefficient because it is often difficult and time consuming to wrap spare pieces of plastic around the connection and then try to tape it down. This method is also wasteful because it inevitably uses excess materials.

SUMMARY OF THE INVENTION

The present invention, in one embodiment, takes the form of a sealing apparatus comprising a thin, flexible sheet of water-impermeable material that can be folded and sealed at its edges. This configuration allows the thin sheet to be folded around an electrical connection, such as a connection between two electrical extension cords, thereby sealing the connection from moisture. A relatively narrow strip of adhesive material is applied to the edge of the thin sheet and preferably extends completely around its perimeter, such that when the sheet is folded, the mating edges of the sheet adhere to each other and create a seal.

In another embodiment the invention takes the form of a sealing apparatus comprising a sleeve made of a thin, flexible, water-impermeable material. The sleeve is configured to slide over an electrical connection, such as a connection between two electrical extension cords, and then be sealed at both open ends, such that the connection is sealed inside the sleeve. A relatively narrow strip of adhesive material is applied to the inside edge of each open end of the sleeve, such that when the open ends of the sleeve are pressed closed, they create a seal. The sleeve optionally may have a crease.

The sealing apparatus advantageously is a disposable, one-time, temporary use item. After the sealing apparatus is applied, it may remain in place to protect the extension cord connection from moisture, etc., as long as required during the concert, sports event, construction or other activity requiring electricity. Once the activity requiring electricity is over, the sealing apparatus may be easily removed by pulling it apart or cutting it from the extension cords, and then it may be thrown away. The sealing apparatus is thus a simple solution to the problem of protecting electrical extension cords from moisture and other elements. It is quick and easy to use, and it provides a fast, inexpensive, and efficient way to cover and protect extension cord connections.

These and other aspects and features of the invention will become more apparent upon reference to the accompanying drawings and description, which illustrate, by way of example, the principles of the invention.

DETAILED DESCRIPTION OF THE PREFERRED EMBODIMENTS

In accordance with the present invention, an apparatus for sealing an electrical connection is provided. By way of example, the electrical connection may comprise a connection between two electrical power cords. In one embodiment, the electrical power cords comprise conventional outdoor extension cords of the type use at venues, such as concerts and construction sites. The extension cords also could be used around the home in non-commercial settings, as well, either indoors or outdoors as may be necessary to protect the electrical connection between the extension cords. As one example, the extension cords may be three-prong extension cords rated for outdoor use.

In one embodiment, the sealing apparatus is configured, generally, as a relatively thin sheet of water-impermeable material that is able to be sealed around a connection between two electrical extension cords, by means of an adhesive material applied to the thin sheet. The sealing apparatus is constructed from thin plastic or vinyl, or some other flexible, substantially water-impermeable material that is resistant to tearing. In some embodiments, the apparatus is in the form of a flat sheet. Optionally, the flat sheet may have a single crease that extends down the middle of the sheet. In other embodiments, the apparatus is in the form of an elongated tube-like sleeve. Optionally, the sleeve may have two creases along the length of the sleeve and on opposite sides, such that the sleeve lies flat when not in use.

Figure 1:
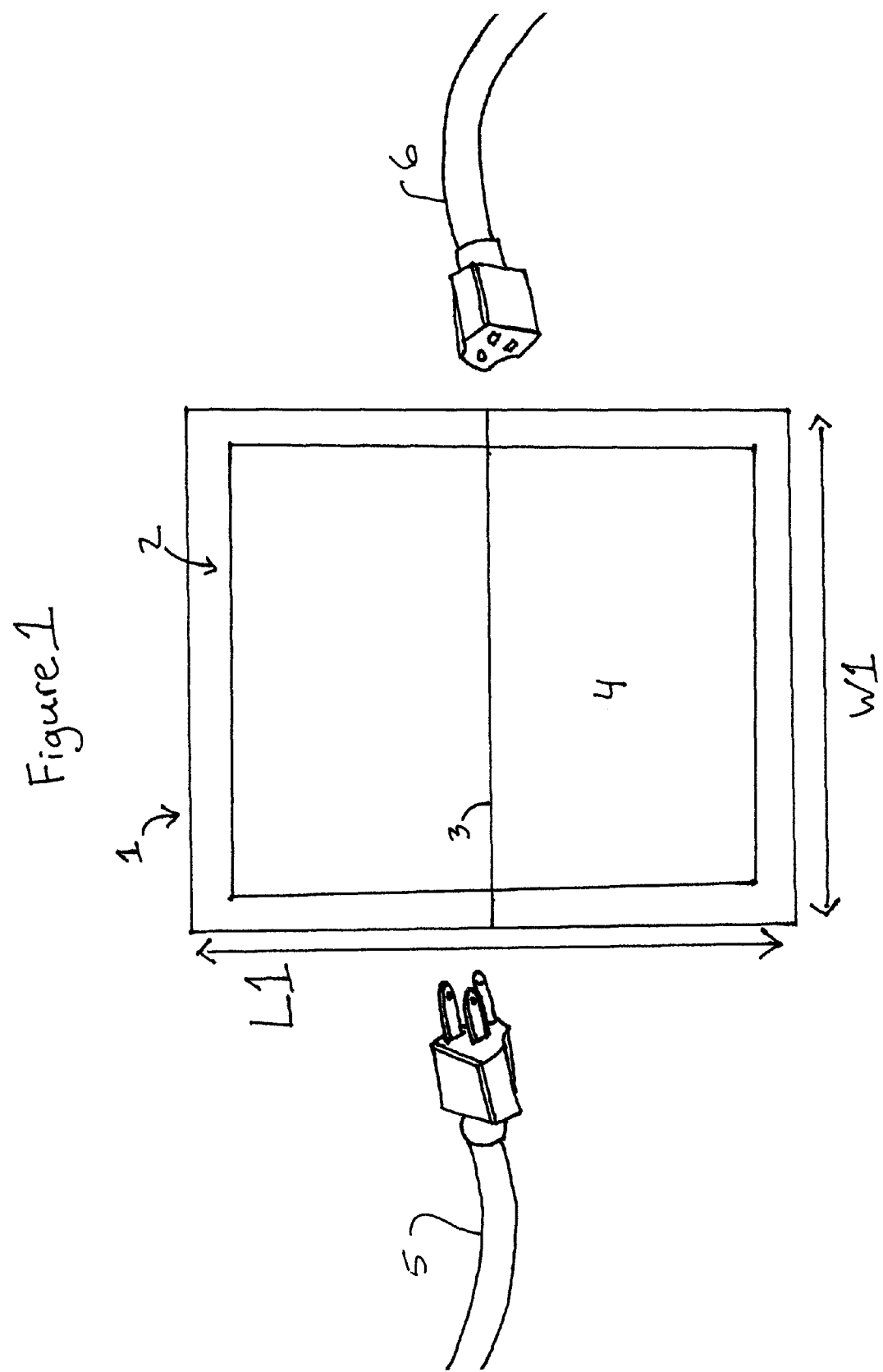
FIG. 1 shows a sealing apparatus for sealing an electrical connection according to a first embodiment of the invention.

FIG. 1 shows a first embodiment of the invention. In this embodiment, the sealing apparatus comprises a single flat sheet 1, made from a substantially water-impermeable material, with a strip of adhesive 2 applied to the edges of the sheet and extending around the perimeter. Preferably, the adhesive strip 2 forms a border that extends continuously around the entire perimeter. In addition, a removable protective backing (not shown) preferably covers the adhesive strip until it is ready to be used. In the figure, the sheet is rectangular in shape, but other shapes are possible, such as a circle, oval, ellipse or rectangle with rounded corners. An optional crease 3 extends across the middle of the sheet and along a line of symmetry, such that when the sheet is folded along the crease, the edges of the sheet on one side of the crease 3 mate with the edges of the sheet on the other side. The crease 3 thus facilitates application of the sealing apparatus around the extension cords to more accurately mate the adhesive edges of the sheet and thereby ensure the best possible moisture-resistant connection. When the sheet is in the folded configuration, the narrow strip of adhesive on one side of the crease adheres to the strip of adhesive on the other side of the crease, and an adhesive-free center area 4 surrounds an electrical extension cord connection within a sealed volume.

The width W1 and the length L1 of the sheet 1 may be set according to the particular application. For most electrical extension cord connections, the width W1 will be between about 5 inches and about 9 inches, and the length L1 will be between about 6 inches and about 10 inches. However, other dimensions are possible depending on the particular size of the electrical connection to be sealed. In one embodiment, the width W1 is about 7 inches and the length L1 is about 8 inches. For particularly large connections the width W1 may be larger than 9 inches, and the length L1 may be larger than 10 inches. The width of the adhesive strip should be relatively small compared to the dimensions of the sheet. Preferably the width of the adhesive strip is between about ¼ inch and about ¾ inch. In one embodiment the width of the adhesive strip is about ½ inch.

To use the sealing apparatus of the first embodiment, an electrical extension cord connection or other type of electrical connection is placed within a center area 4 on one side of the sheet 1. Any protective backing covering the adhesive strip 2 is removed. Then the sheet is folded along crease 3 and around the connection. The adhesive edges on one side of the crease are mated with the adhesive edges on the other side of the crease so that the edges adhere to each other. Then the mated edges are pressed together firmly, thereby creating a water tight seal and a sealed volume containing the electrical extension cord connection.

Alternatively, the electrical connection may be placed in the center area 4, and the sheet 1 may be folded or rolled around the extension cords to seal them. In this way, the sheet 1 is wrapped around the electrical connection forming a sleeve-like enclosure, and the adhesive 2 is adhered to the portions of the sheet (on the opposite side) where there is no adhesive. Once the electrical connection has been wrapped up, the ends of the sheet may be pressed down firmly to seal the sheet around the electrical connection.

Figure 2:
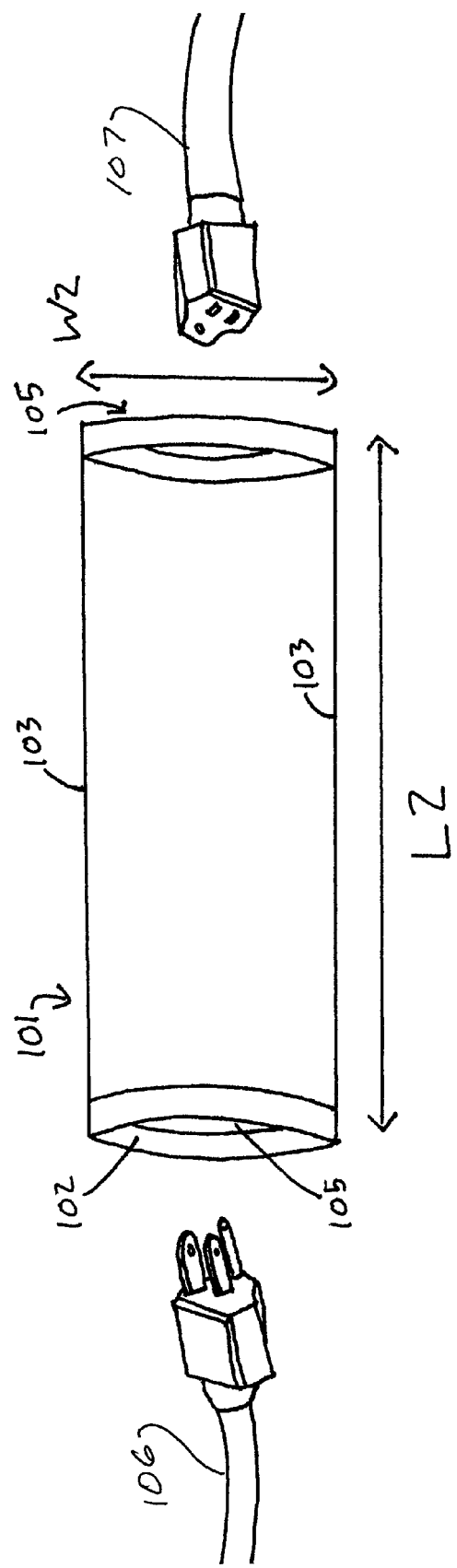
FIG. 2 shows a sealing apparatus for sealing an electrical connection according to a second embodiment of the invention.

FIG. 2 shows a second embodiment of the invention. In this embodiment the sealing apparatus is generally in the shape of a sleeve 101, made from a substantially water-impermeable material. The sleeve 101 has an opening 105 at each end, and a strip of adhesive 102 is applied around the inside edge of each opening 105. Preferably, the adhesive strip is applied completely around the inside edge of each opening. The sleeve also preferably has two optional creases 103 along its entire length. The creases 103 are on diametrically opposite sides of the sleeve such that the sleeve lies flat when it is not being used.

Like the first embodiment, the width W2 and the length L2 of the sleeve 101 may be set according to the particular application. For most extension cord connections the width W2 will be between about 4 inches and about 8 inches, and the length L2 will be between about 8 inches and about 16 inches. However, other dimensions are possible depending on the size of the particular connection to be sealed. In one embodiment, the width W2 is about 6 inches and the length L2 is about 12 inches. Like the first embodiment, the width of the adhesive strip should be relatively small compared to the dimensions of the sheet. Preferably the width of the adhesive strip is between about ¼ inch and about ¾ inch. In one embodiment the width of the adhesive strip is about ½ inch.

To use the sealing apparatus of FIG. 2, by way of example, one electrical extension cord is placed into one of the sleeve openings 105 and completely through the sleeve 101 before connecting it to a second extension cord. The sleeve 101 is preferably moved over the extension cord past the connection end so that the two cords can be plugged into each other without the sleeve getting in the way. If desired, the extension cords may also be connected within the sleeve so that the sleeve does not have to be moved. If the sleeve is moved past the connection end before connecting the extension cords, then after connecting the cords the sleeve is moved back over the connection so that it surrounds the connection completely. Any protective backing that is covering the adhesive strips 102 is removed, and each open end 105 of the sleeve is firmly pressed closed. The openings are closed such that the adhesive strip 102 between the two optional creases 103 on one side of the opening 105 adheres to the adhesive strip between the two optional creases 103 on the other side of the opening 105. This creates a sealed volume within the sleeve containing the connection.

The material used for the sealing apparatus should be water-impermeable, flexible, and durable. For example, a heavy-duty plastic or vinyl material that is resistant to tearing and leaks is preferable. The adhesive strip may be in the form of a double-sided adhesive tape that is applied to the appropriate portions of the apparatus, or adhesive may be applied directly to the apparatus in the appropriate locations. In either configuration, there is preferably a protective backing placed over the adhesive strips, which can be easily removed when a user is ready to use the apparatus.

The sealing apparatus in both embodiments comprises a disposable, one-time, temporary use item that is can be quickly and easily used to protect extension cords from moisture and other elements. After the sealing apparatus is applied, it may remain in place to protect the extension cord connection as long as required during the concert, sports event, construction or other event or activity requiring electricity. Once the event or activity requiring electricity is over, the sealing apparatus may be easily removed by pulling it apart or cutting it from the extension cords. Upon removal, the sealing apparatus may be discarded appropriately, and the extension cords may be coiled and stored for use at the next event or activity.

The sealing apparatus is thus a simple, disposable solution to the problem of protecting electrical extension cords from moisture and other elements. It is quick and easy to use, and it provides a fast, inexpensive, and efficient way to cover and protect extension cord connections. It is also quick and easy to remove, thus making the entire process of protecting the extension cords very simple from start to finish.

A sealing apparatus and method for sealing an electrical extension cord connection is provided as described above. While the structure of the apparatus has been described in terms of certain specific embodiments, there is no intention to limit the invention to the same. It should be understood that the foregoing is only illustrative of the principles of the invention, and that various modifications, alterations, and combinations can be made by those skilled in the art without departing from the scope and spirit of the invention. Accordingly, it is not intended that the invention be limited, except as by the appended claims.

What is claimed is:

1. A temporary sealing apparatus for temporarily sealing an electrical extension cord connection, the apparatus comprising:
   a thin sheet of flexible, substantially water-impermeable material; and
   a thin strip of adhesive applied to one side of the sheet, along its perimeter;
   wherein the sheet is configured to be wrapped around a connection between plug-in type electrical extension cords, such that the adhesive on one portion of the sheet may be adhered to any other portion of the sheet, or the adhesive thereon, to form a sealed volume surrounding the connection.

2. The temporary sealing apparatus of claim 1, wherein the plug-in type electrical extension cords are three-prong extension cords rated for outdoor use.

3. The temporary sealing apparatus of claim 1, wherein the sheet comprises a flexible plastic material that lies in a flat condition prior to use.

4. The temporary sealing apparatus of claim 1, wherein the strip of adhesive comprises a double-sided adhesive tape that extends continuously along the entire perimeter of the sheet.

5. The temporary sealing apparatus of claim 4, further comprising a removable backing for covering the adhesive tape until it is ready to be used.

6. The temporary sealing apparatus of claim 1, wherein the sheet is rectangular in shape prior to use.

7. The temporary sealing apparatus of claim 1, wherein the sheet has a crease along a line of symmetry such that when the sheet is folded at the crease the sheet is folded in half.

8. A method for temporarily sealing an electrical extension cord connection, the method comprising:
   providing a thin sheet of flexible, substantially water-impermeable material, one side of the sheet having a strip of adhesive along its perimeter;
   providing two or more plug-in type electrical extension cords;
   plugging the extension cords together to form an electrical connection;
   placing the sheet onto the extension cords such that the electrical connection is located within the perimeter of adhesive; and
   wrapping the sheet around the electrical connection, such that the adhesive on one portion of the sheet contacts any other portion of the sheet, or the adhesive thereon, to temporarily seal the electrical connection within a volume created by said wrapped sheet.

9. The method of claim 8, wherein wrapping the sheet comprises folding the sheet substantially in half, the method further comprising pressing down along the edges of the sheet after folding the sheet substantially in half to cause adhesive on opposing portions of the sheet to adhere to each other to form a seal.

10. The method of claim 8, wherein the adhesive is covered by a removable backing, the method further comprising removing the backing before wrapping the sheet.

11. The method of claim 8, wherein the sheet is placed around an electrical connection comprising two plug-in type electrical extension cords that are three-prong extension cords rated for outdoor use.

12. The method of claim 8, wherein the sheet is provided with a crease along a line of symmetry such that when the sheet is folded at the crease the sheet is folded substantially in half.

13. The method of claim 8, further comprising removing the sheet from the extension cords by tearing or cutting the sheet, disposing of the sheet after it has been removed from the extension cords, and storing the extension cords for future use.

14. The method of claim 8, wherein the method is performed at an outdoor venue.

15. The method of claim 14, wherein the outdoor venue comprises a concert, sports event or construction site.

16. A temporary sealing apparatus for temporarily sealing an electrical extension cord connection, the apparatus comprising:
   a flexible, substantially water-impermeable sleeve, having an opening at each of two ends; and
   a strip of adhesive along the inside edge of each opening;
   wherein the sleeve is configured to receive and surround a connection between plug-in type electrical extension cords, and wherein the ends of the sleeve are configured to be compressed such that the adhesive temporarily seals the sleeve around the electrical connection.

17. The apparatus of claim 16, further comprising a removable backing for covering the adhesive until it is ready to be used.

18. The apparatus of claim 16, further comprising two diametrically opposed creases running along the length of the sleeve.

19. The apparatus of claim 16, wherein the sleeve is made from a flexible plastic material.

20. The apparatus of claim 16, wherein the plug-in type electrical extension cords comprise three-prong extension cords rated for outdoor use.

21. A method for temporarily sealing an electrical extension cord connection, the method comprising:
   providing a flexible, substantially water-impermeable sleeve having an opening at both ends, each opening having a strip of adhesive around its inside edge;
   inserting a first electrical extension cord having a plug-in type connection end into an opening at one end of the sleeve;
   plugging the connection end of the first electrical extension cord into a plug-in type connection end of a second electrical extension cord, thereby forming an electrical connection between the first and second electrical extension cords;
   positioning the sleeve relative to the electrical connection such that the electrical connection is located within the sleeve; and
   sealing the sleeve around the electrical connection by pressing the edge of each sleeve opening against itself such that each opening is sealed closed, thereby temporarily sealing the electrical connection inside the sleeve.

22. The method of claim 21, wherein the sleeve comprises two diametrically opposed creases running along the length of the sleeve.

23. The method of claim 21, wherein the step of pressing the edge of each opening against itself further comprises, for each opening, pressing the adhesive strip portion between the two creases on one side of the opening, against the adhesive strip portion between the two creases on the opposite side of the opening.

24. The method of claim 21, wherein the strip of adhesive is covered by a protective backing, and the method further comprises removing the backing before the openings are sealed closed.

25. The method of claim 21, wherein the sleeve is made from a flexible plastic material.

26. The method of claim 21, further comprising removing the sleeve from the extension cords by tearing or cutting the sleeve, disposing of the sleeve after it has been removed from the extension cords, and storing the extension cords for future use.

27. The method of claim 21, wherein the method is performed at an outdoor venue.

28. The method of claim 27, wherein the outdoor venue comprises a concert, sports event or construction site.

* * * * *